United States Patent [19]

Ramberg et al.

[11] 4,001,643
[45] Jan. 4, 1977

[54] METHOD AND APPARATUS FOR A POWER CIRCUIT BREAKER CONTROLLER

[75] Inventors: Harold C. Ramberg, Canby; Alvin C. Legate, Beaverton, both of Oreg.

[73] Assignee: The United States of America as represented by the Secretary of the Interior, Washington, D.C.

[22] Filed: May 29, 1975

[21] Appl. No.: 582,005

[52] U.S. Cl. .................. 317/11 E; 317/11 A; 307/133
[51] Int. Cl.$^2$ ........................... H01H 7/16
[58] Field of Search ............ 317/11 A, 11 C, 11 R, 317/11 E; 307/135, 136, 133

[56] References Cited
UNITED STATES PATENTS

| 3,249,810 | 5/1966 | Strom et al. | 317/11 A |
| 3,566,152 | 2/1971 | Casey et al. | 317/11 A X |
| 3,891,813 | 6/1975 | Yoon et al. | 317/11 A X |

Primary Examiner—J. D. Miller
Assistant Examiner—Patrick R. Salce
Attorney, Agent, or Firm—Thomas Zack; Donald R. Fraser

[57] ABSTRACT

A power circuit breaker controller and its method of use. Surge voltages associated with the closing of a high voltage circuit breaker for a polyphase alternating current line are lowered substantially by our invention. Although several lines and phases are involved, each is considered and operated independently of the other. All lines have preinserted closing resistors, to reduce the surge voltages, that are preinserted in parallel across the main contacts of each phase one step prior to the main contact closing. Between the resistor switch closings certain staggering takes place. For example, if 3 phases are involved the resistor closings are staggered by about 60 or more electrical degrees. Further, there is circuitry to insure that the polarity of the bus side phase-to-ground voltage is of the same polarity as the trapped charges on the corresponding phases on the line side of the breaker when the resistor switch contacts are engaged. When the voltage across the main contacts is zero after the resistor is inserted, circuitry provides that the main contacts be directly engaged and the resistors be shortened out.

7 Claims, 10 Drawing Figures

METHOD AND APPARATUS FOR A POWER CIRCUIT BREAKER CONTROLLER

BACKGROUND OF THE INVENTION

1. Field of the Invention

The invention set forth in this specification is a method and apparatus for a power circuit breaker controller for use with high voltage switches.

2. Description of the Prior Art

It is well known to those familiar with switches used in high voltage lines that upon closure a voltage surge can be sent over the line and can be significantly increased in magnitude by the presence of trapped line charges. In some cases, the crest surge voltage can be more than double the value of the normal line bus voltage. If no protection were provided against these voltage line surges, too high a voltage would be placed on the adjacent and connecting equipment possibly causing damage to it. Several methods and types of equipment have been suggested and used to reduce these voltage surges. If the voltage surge causes a spark to jump a gap, massive amounts of insulation can be applied to prevent such from happening. However, when large areas are transversed by the high voltage power lines, like in the Pacific Northwest, the use of large amounts of line insulation has proven too costly. The emphasis has, as a result, been to try to concentrate on controlling the closing circuit breaker to prevent large voltage surges from happening. The two known publications which best describe the state of the art in this area are the U.S. Pat. No. 3,566,152 to Edward J. Casey et al and the C.I.G.R.E. Paper No. 143 by E. Maury published in 1966 by the Conference International de Grands Reseaux Electriquies in Paris, France. In the Casey patent, the first phase line to close occurs when the bus-side voltage loop is of the same polarity as the trapped line charge of the same phase line. The second and third phase lines are closed at staggered 30 to 120 electrical degree increments without consideration for bus-side voltage and trapped line charge polarities. This type of operation does not eliminate the possibility that surge voltages of about two times normal crest voltages can be present on the lines of the second and third phases upon closure. Further, when only one closing resistor is used with each phase line as in our invention, the Casey reference differs in that it does not use controlled synchronous closing of the main contacts to by-pass the closing resistors when the voltage across the closing resistor in each phase line is zero.

The E. Maury paper proposed that surge voltages be reduced by synchronizing closings of the main contacts of the breaker with voltage zero across the preinserted resistor. The exact initial instant the resistor is preinserted did not appear important. This is contrary to our findings that it is absolutely necessary for the preinserted resistor contacts be closed when the polarity of the bus-side voltage and the trapped charge is the same.

SUMMARY OF THE INVENTION

The controller power circuit breaker of this invention is used with high voltage power lines to reduce voltage surges upon closure of the switch contacts. Typically, several separate adjacent power lines are involved each of which has a certain bus line voltage that is operating electrically at a different phase from the others. Within each line a main closure contact and a single preinsertable series resistor exists. Appropriate circuitry shorts out the path through the resistor by closing the main contacts when the projected voltage across the main closure contacts is near or at zero. At all other times, there is circuitry with appropriate timing means to insure that the resistor is preinserted operatively into the line before main contact closure only when the predicted polarity of the bus-side voltage and trapped charged voltage are the same.

The primary object of this invention is a method for closing a high voltage circuit breaker.

Another object of this invention is the apparatus for operating the closure of a high voltage circuit breaker to minimize line voltage surges according to the method claimed.

When high voltages, currently in the 500-kilovolt (kV) or higher range, are present in a power transmission system, it sometimes becomes necessary to shut down the system. A power circuit breaker (PCB) is usually employed to switch the system on and off. Our invention is directed to the voltage surges associated with the closure of the PCB and seeks to limit the flashover levels to no more than 1.5 times the normal line-to-ground voltage of the system. It has been the practice to preinsert a single large ohm (about 400 ohms) resistor in series with the source and the line before the contacts are closed. This preinserted resistor is usually in parallel with the main contacts and functions to reduce the magnitude of the switching surge voltage applied to the line. Typically, the resistor contacts will close about 6 to 8 milliseconds before the main contacts.

Figure 1:
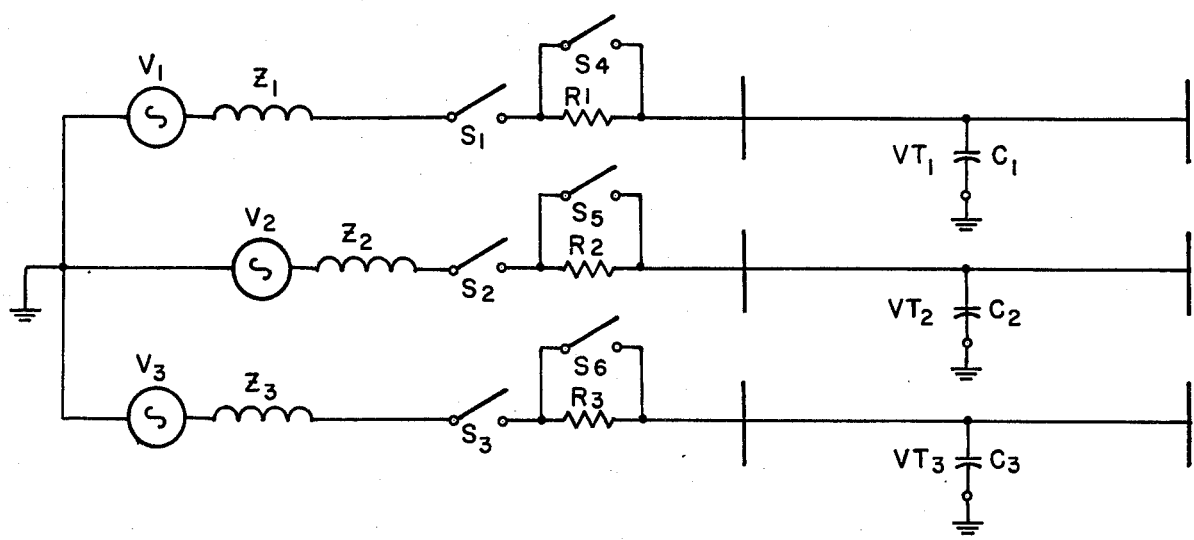
FIG. 1 is a schematic set up employing our invention on three-phase lines.
Figure 2A:
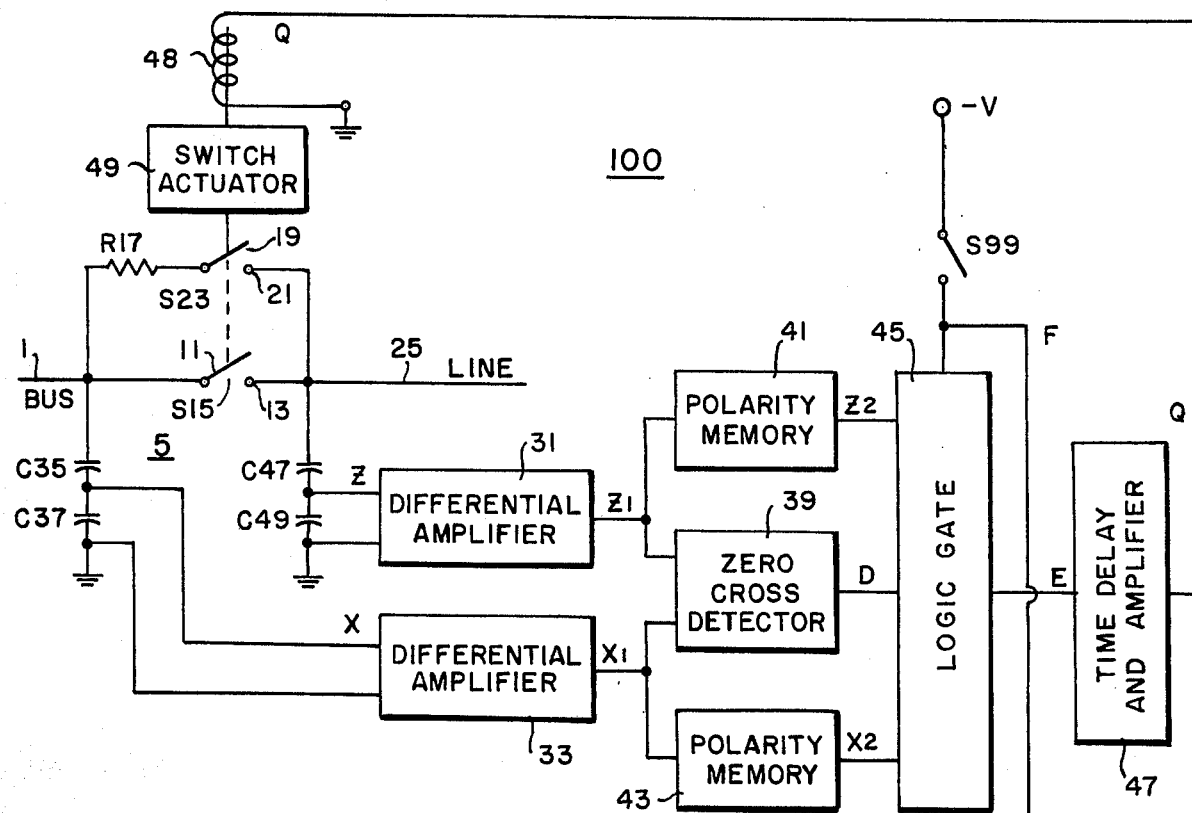
Figure 2A:
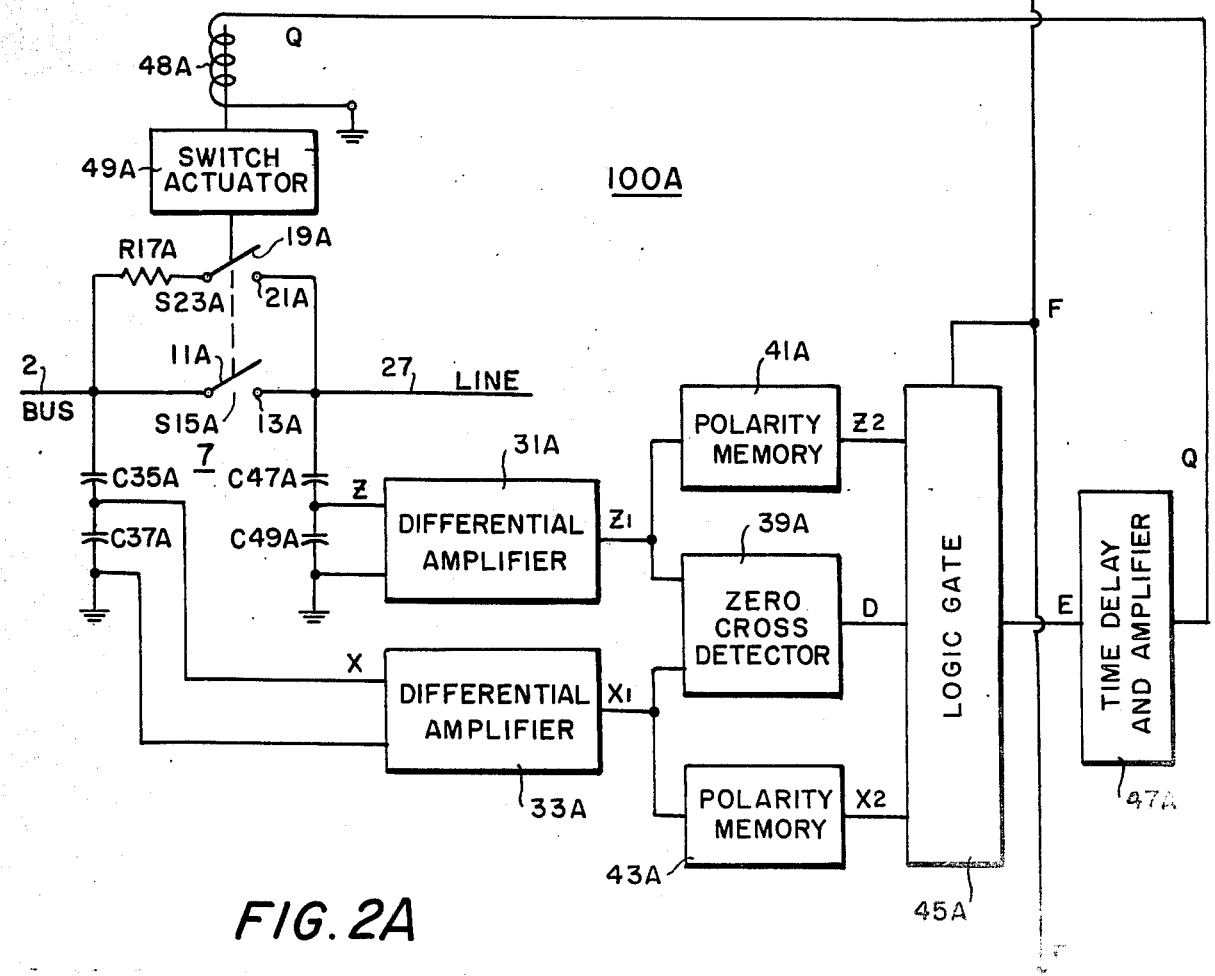

The schematic diagram of FIG. 1 illustrates the apparatus needed to practice our invention. There are three separate high voltage phase lines having bus line voltage levels V1, V2, and V3 with corresponding source impedances of Z1, Z2, and Z3. Each phase line and its associated PCB is operated and switched independent and autonomously of the others. Therefore, the description of the operation of one line will be the same for all lines. The main contact switches for each line are S4, S5, and S6 corresponding, respectively, to the phase lines V1, V2, and V3 as shown. Each line also has a single preinsertable closing resistor R with its associated closing contact S designated by the letters R1 and S1 for line V1, R2 and S2 for line V2, and S3 and R3 for line V3. The line capacitances C1, C2, and C3 with their respective trapped voltage levels of VT1, VT2, and VT3 represent the remainder of the transmission line that is switched off and remote from its power source. In many cases, the total lengths of these actual high power transmission lines can equal 200 miles.

Besides being operated autonomously, each PCB of each phase line has certain other operations to perform according to our invention. First, the polarity of the a-c source voltage V1 governs the time the resistor R1 is operationally inserted or switched into the line. At this instant the polarity of the source voltage V1 must be the same as the polarity of the trapped voltage charge VT1. Should the current generated by voltage source V1 be zero through insertion resistor R1, then at that time the main contact switch S4 will close to by-pass or short out the resistor R1. The same reasoning applies to the lines V2 and V3 so that there is a matching of negative or positive polarities, depending on the time of resistor insertion and the trapped line charges, and when there is zero current in the insertion resistor, then the main contact switches (S5 and S6) are simply closed to by-pass their respective insertion resistors R2 and R3.

Figure 2:
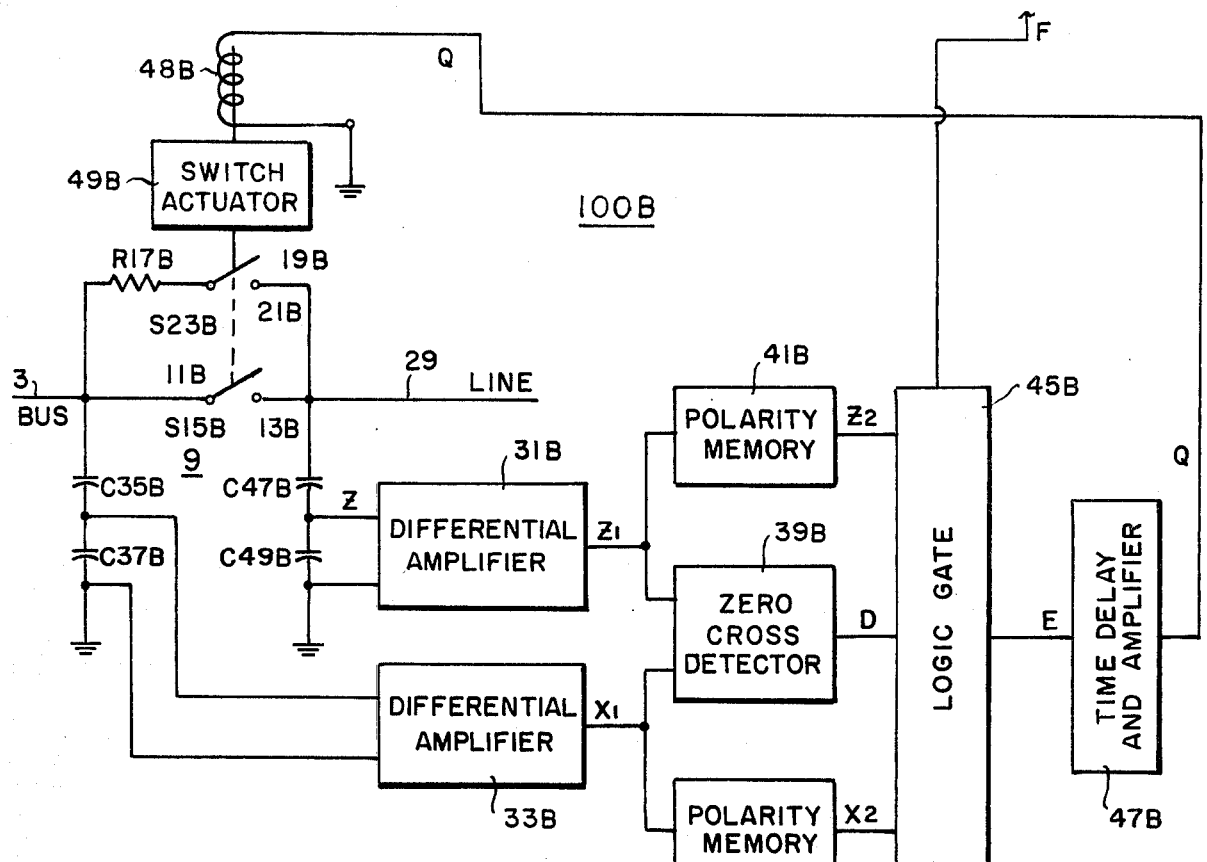
FIGS. 2, 2A is a system set up with our invention using three-power lines.

It is quite apparent that there must be some type of timing circuitry, logic circuitry and other supporting circuitry to accomplish the control needed to meet the requirements described with respect to the FIG. 1 schematic diagram. In FIG. 2 there are three spaced phase lines 1, 2, and 3 constituting the high voltage polyphase conductors. Each line has its own circuit breaker assembly designated by the numbers 5, 7, and 9. These circuit breakers and control circuitry are identical in function and structure and therefore, a description will be made only with respect to breaker 5, with its control circuitry it being understood breakers 7 and 9 are the same. The same numbers have been used to designate the same structural and functional components in breakers 7 and 9 as in breaker 5 except that subscriptions A and B, respectively, have been added. A main switch S15 of the breaker 5 has a movable contact 11 and a stationary contact 13. Shunting this main contact is the series combination of the preinsertable resistor R17 and the resistor switch S23. This switch has two contacts one of which is movable 19 and the other of which is stationary 21. Resistor R17 is preinserted into the high voltage in parallel with the main switch S15 several milliseconds before the engagement of contact 11 with contact 13.

Under our invention, the three breaker-line combinations operate autonomously from each other. Since, the first requirement of our invention is to engage the resistor through switch S23 when the bus voltage on line 1 is of the same polarity as the trapped charge on line 25, there must be some control circuits as the time duration between opening and closing of main switch S15 is usually 40 electrical cycles or less. Control unit 100 performs this function as well as closing the main switch S15 when the voltage across the main contacts is zero. This control unit senses the bus voltage polarity and its direction of change as well as the instant the bus voltage crosses zero. The capacitive voltage divider 35 and 37 monitors the bus voltage and at the same time produces a low voltage signal X across the smaller capacitor 37. It divides the large bus voltage by a factor of about 3,000 to a workable level. The voltage signal X repesents the bus-to-ground voltage and has a fixed phase relationship with respect to the actual bus-to-ground voltage. Signal X is applied to the operational amplifier of circuit 33 which is used as a differential amplifier whose output signal X1 is applied to the zero crossing detector 39 as well as the polarity memory 43.

Both the detector 39 and memory 43 output signals (D and X2, respectively) are sent to the logic gate 45.

The polarity sensing means in the control circuit 100 functions to sense the polarity of the voltage trapped on the line conductor at the time the circuit breaker 5 was opened to interrupt the alternating current. Basically, a capacitive voltage divider having a pair of capacitors 47 and 49 produce a low voltage signal Z across capacitor 49. Like the bus voltage detecting circuit capacitors (35 and 37), these capacitors divide the line voltage by a factor of about 3000 to produce a low voltage signal Z which is an accurate reproduction of the line-side phase-to-ground voltage that bears a fixed relationship with respct to the actual phase-to-ground voltage. Signal Z is applied to the operational amplifier 31. This amplifier acts as a differential amplifier whose output signal Z1 is applied to the polarity memory 41 and the zero crossing detector 39. The outputs from polarity memory units 41 (signal Z2) and 43 (signal X2) along with the zero crossing detector output (signal D) are all applied to the logic gate circuit 45.

The two polarity memory circuits 41 and 43 are similar to each other and interchangeable. Thus, the two capacitive voltage dividers — 35–37 and 47–49 — could be interchanged to monitor either the bus or line voltages. In other words, if the breaker 5 is the juncture between two lines, it may switch either line using the voltage signal (X or Z) from the other line as the bus reference. When normally open — switch S99 is closed and connects a negative 12 volts to the logic circuit 45. This will allow an output signal E which initiates the timer delay and amplifier 47 which in turn outputs a signal Q to energize the breaker close solenoid coil 48. This coil closing signal Q causes the preinserted resistor contacts of switch S23 to close when the bus polarity of the bus voltage and the trapped charge polarity is the same. The normally open switch S99 may be thought of as a closing command switch. It can be operated either manually or by a suitable automatic reclosing relay (not shown). The Q signal energizes a solenoid coil 48 which will cause the actuator 49 to either release a mechanical or pneumatic force (not shown) which will close the breaker switches S15 and S23.

Figure 3:
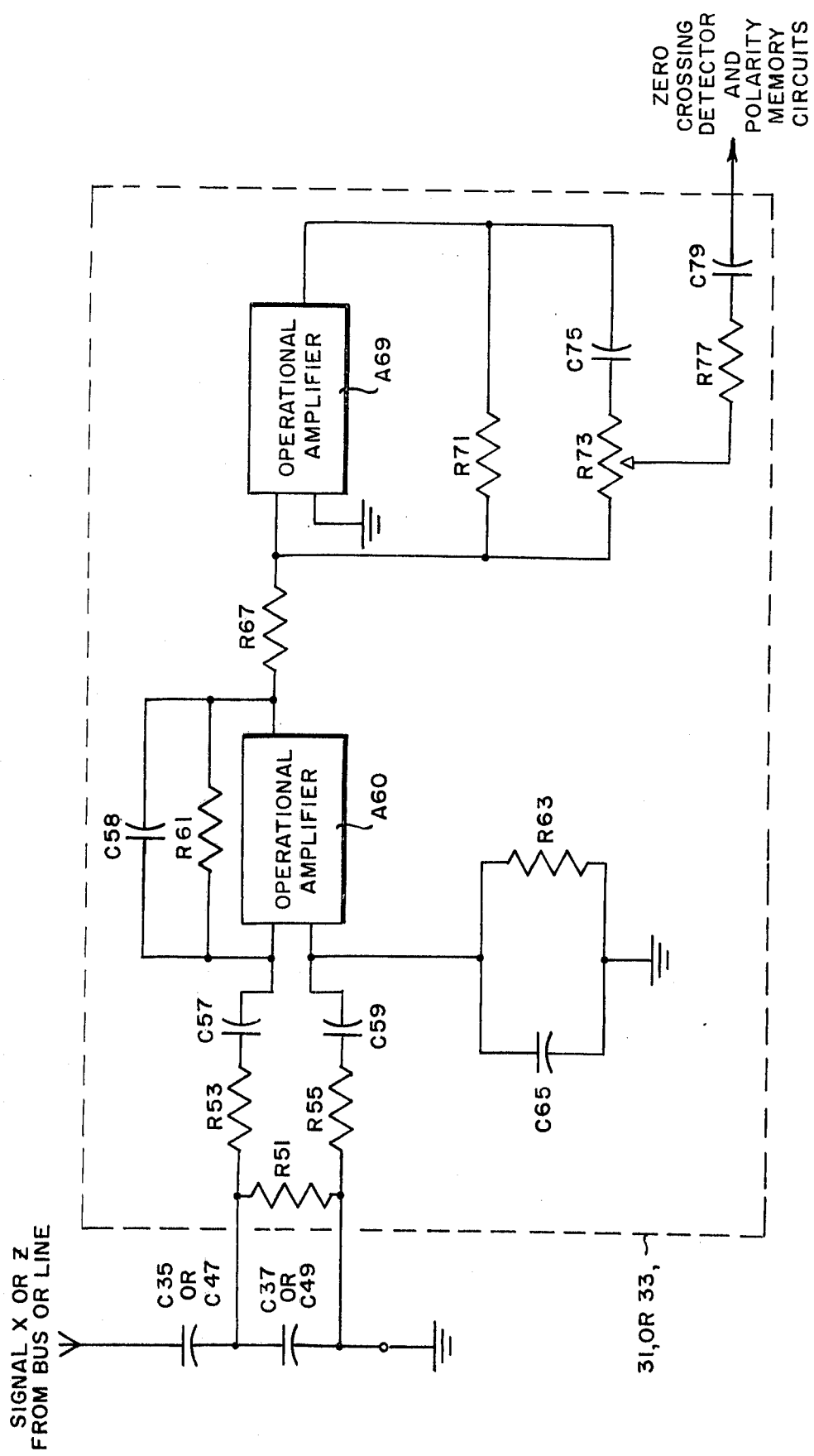
FIG. 3 illustrates the input and phase adjust circuits used in the FIG. 2 system.

As described the bus voltagge is to the left of the switch S15 and S23 in FIG. 2 and the trapped line voltage charge to the right of the contacts of these switches. Signal X would be representative of the bus voltage and signal Z of the line voltage charge. Both of these signals are fed to their respective differential amplifiers 31 and 32. Each amplifier is specifically designed to withstand high differential voltages of several thousand volts. In addition each has phase compensation circuits to compensate for phase differences between the bus and line signal voltages created by variations in the capacitance dividers, amplifiers and interconnecting signal cables. The operational amplifiers 31 and 33 shown in FIG. 3 will be described in greater detail.

Each of the polarity memory circuits 41 and 43 consists of an operational amplifier used in a flip-flop circuit which tracks a signal voltage (X or Z) from the bus or line. The memory circuits normally output a low level signal corresponding to a negatively trapped charge on the line. Should a positive trapped charge be left on the line when the breaker 5 is initially open, the memory outputs a high level signal but only after the input signal Z from the line has been removed for approximately 32 milliseconds. The voltage threshold of the memory circuit is set at aproximately 20 percent of the peak signal input voltage (signal X or Z) which is a direct ratio of the bus or line voltage. This offset of 20 percent above zero is necessary to reject noise signals which would produce errors in the trapped charge polarity indication.

The zero crossing detector is in essence a summing amplifier which sums the input voltages from each signal X1 and Z1. The Z1 signal corresponds to the trapped voltage line charge on the line which acts like a charged capacitor in that it has no a.c. variation. As the zero crossing detector will sum only the a.c. signals it will interpret the Z1 signal as zero. Thus, the summed signal D will correspond to the X1 a.c. signal in the example shown. By using two input signals from the bus and trapped charge lines it is possible to read the zero crossing point on the wave regardless of which side is considered the bus or line without having to rewire the circuit. The output signal D from the zero detector unit is applied to the logic gate circuitry 45 as are the two memory circuit output signals X2 and Z2. The zero detector, shown in FIG. 5, will be described in greater detail below.

Within the logic gate circuits 45 are gating controls for polarity switching and also circuitry to initiate the timer delay 47. The magnitude of the signals X2 and/or Z2 from the memory circuits indicate the polarity of the line charge. Signal D from the zero crossing detector circuit 39 may or may not be inverted as it is sent to the logic gate depending on the polarity of the trapped charge. However, signal D does provide the voltage zero reference signal for point-on-wave switching. This reference signal plus an enabling signal F produced by an operator in a control house closes switch S99 which will initiate the timer delay in the timer delay and amplifier circuitry 47. The timer delay in the circuitry box 47 functions to delay the close signal Q from its output amplifier until the necessary point-on-wave signal D occurs so that the closing resistor will be by-passed with the main contacts when the current through the closing resistor is zero. Typically, the time delay range will vary between 2.5 to 22 milliseconds after which time the delay close signal will be amplified and sent as signal Q to the coil 48. This coil in turn closes the two switches of breaker 5. The interval of time between the first closing of switch S23 and the second closing of switch S15 is a fixed predetermined time interval fixed by the manufacturer typically about 8 milliseconds.

FIGS. 3 to 7, inclusive, illustrate in more detail the various circuits mentioned in describing the FIG. 2 system. What was represented by the identical blocks 31 and 32, each labelled differential amplifier for simplicity purposes, is in reality circuitry like that which is shown within the dotted lines of FIG. 3. To give the circuitry greater versatility in its actual use, capacitor dividers C47 and C49 may be interchanged with the capacitor dividers C35 and C37 connected to the bus line. Resistors R51, R53, and R55 as well as capacitors C57 and C59 were selected to protect the operational amplifier A60 from the effects of high differential and common mode voltages. These same components were also designed for a minimum phase shift of the input 60 Hz voltage signals X or Z which are attenuated by the resistors R53 and R61 and the amplifier A60. Resistor R63 and capacitor C65 are included to reduce the differential error. The output of amplifier A60 is an inverted image of the input voltage signals X or Z. It is applied to the unity gain operational amplifier A69 where the unity gain is achieved by the proper selection of resistors R67 and R71. Resistor R73 and capacitor C75 permit the phase of the output voltage from amplifier A69 to be adjusted for a zero phase shift between the output of amplifier A69 and the voltage signals X or Z from its respective capacitor divider. Signals X1 or Z1 from this amplifier are coupled by resistor R77 and capacitor C79 to the zero crossing detector circuit 39 and polarity memory circuit 41 (or 43).

Figure 4:
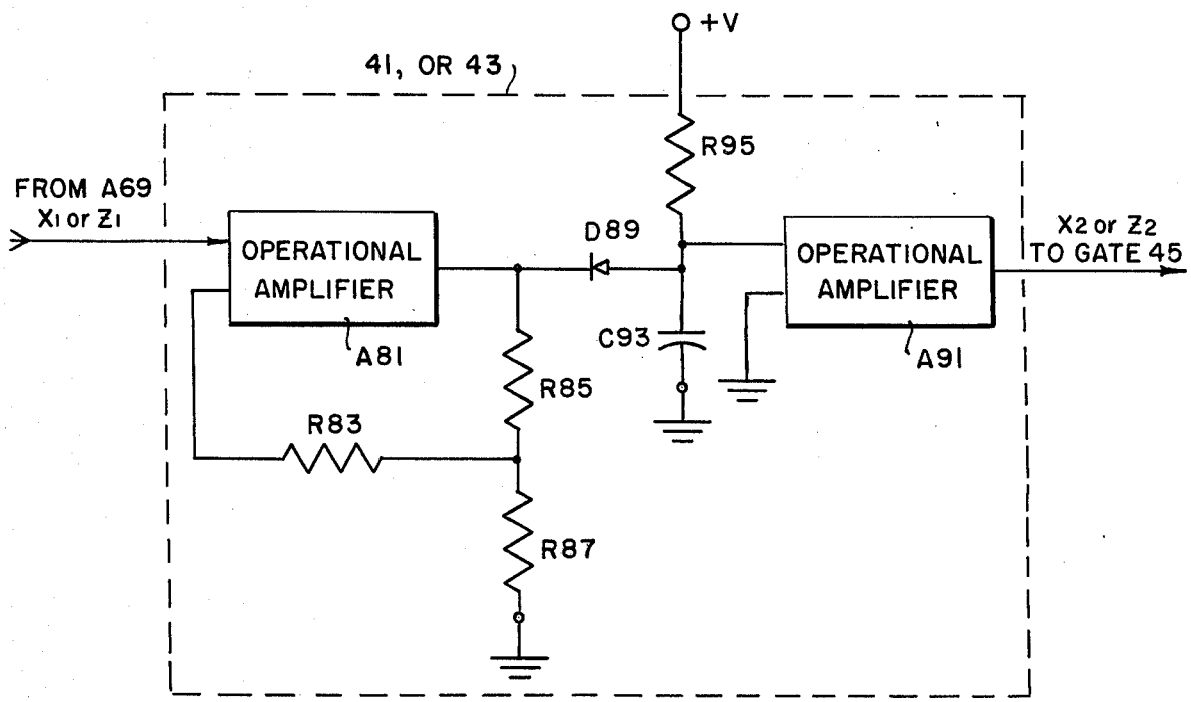
FIG. 4 illustrates the polarity memory circuits used in the FIG. 2 system.

Voltage signals X1 and Z1 are applied to the zero crossing and polarity memory circuits as indicated in FIG. 2. In FIG. 4, the basic components for each polarity memory circuit are shown. Beginning with operational amplifier A81, voltage signal X1 or Z1, as the case may be, is inputted resulting in an inverted and attenuated signal outputted from the capacitor dividers 35–37 or 47–49. Depending on its inputted voltage signal, amplifier A81 will output a positive or negative signal. The three resistors R83, R85, and R87 act in a positive feedback circuit arrangement to amplifier A81 to insure a switching threshold level which will not permit an output polarity signal until 20 percent of the peak voltage level of the opposite polarity is inputted to amplifier A81. This voltage threshold level minimum value reduces the possibility that noise or other extraneous signals will change the state of the polarity memory amplifier A81. After switching the output from the amplifier is the same polarity as the polarity of the input signals X or Z from the two sets of capacitor dividers. If the output of amplifier A81 is negative, then diode D89 is forward biased so that it effectively connects the output of amplifier A81 to the input of amplifier A91. Capacitor C93 will experience a voltage drop of one diode drop, approximately one volt, above the output of amplifier A81 after there has been a time delay which is dependent on the time constant of the circuit. If the output of amplifier A81 switches positive, diode D89 prevents this positive signal from influencing the positive charge rate of capacitor C93. At this time the charge rate of capacitor C93 would be dependent on the value of resistor R95. This charge rate is slower than the discharge rate of capacitor C93 when the output of amplifier A81 is negative. Because of this difference in charge and discharge rates, capacitor C93 is normally held in a negative state. This negative state corresponds to the negative trapped charge on the line when a 60 hertz (hZ) voltage signal X or Z is present on the capacitor divider monitoring the line side voltage. When the FIG. 2 circuit breaker 5 is opened and the polarity of the last voltage loop prior to the opening of the breaker is positive, capacitor C93 will begin to charge from its negative state to a positive state at a rate dependent on the value of resistor R95. Amplifier A91 is at the same time functioning as a comparator and buffer to monitor the voltage across capacitor C93 with respect to ground. When the capacitor voltage changes from negative to positive it will remain in this state since the breaker is open and there will not be a negative voltage loop from the signal X or Z to change this state until the breaker is reclosed.

Figure 5:
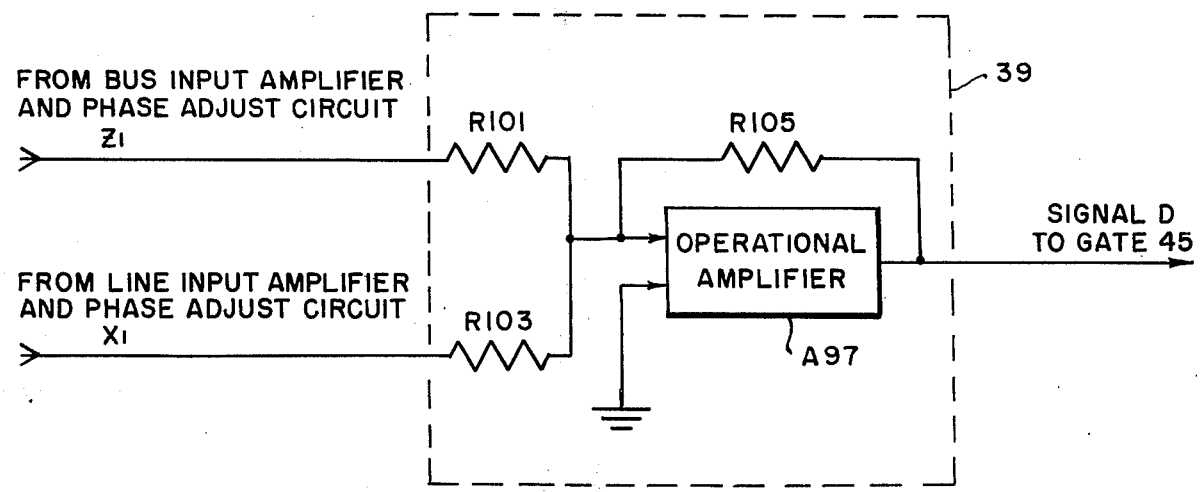
FIG. 5 illustrates the zero crossing detector circuits used in the FIG. 2 system.

FIG. 5 shows a breakdown of the zero-crossing detector indicated as block 39 in FIG. 2. Signals $X_1$ and $Z_1$ representing the inverted attenuated image of signals X and Z are summed at the input to operational amplifier A97. Resistors R101, R103, and R105 have their values selected so that amplifier A97 is saturated when a normal input signal level is reached. At its output square waves synchronized with the 60-HZ signal voltages X and Z from the capacitor dividers are present. This square wave output signal D serves as a time reference for the logic circuit 45 and the time delay and amplifier circuit 47.

The four voltage signals X2, Z2, D, and the close signal F from normally opened switch S99 are the inputs to logic circuit 45 and signal E is its output signal. The purpose of this logic gate circuit is to provide voltage signal E to the time delay and output power amplifier circuit 47 which will, after a specified time delay, produce a signal Q to energize the breaker close coil 48. Switch S23 will close as a result when the bus voltage and the trapped line charge voltage are of the same polarity. This in turn will cause switch S15 to close after a predetermined time delay when the current through the closing resistor is zero.

Figure 6:
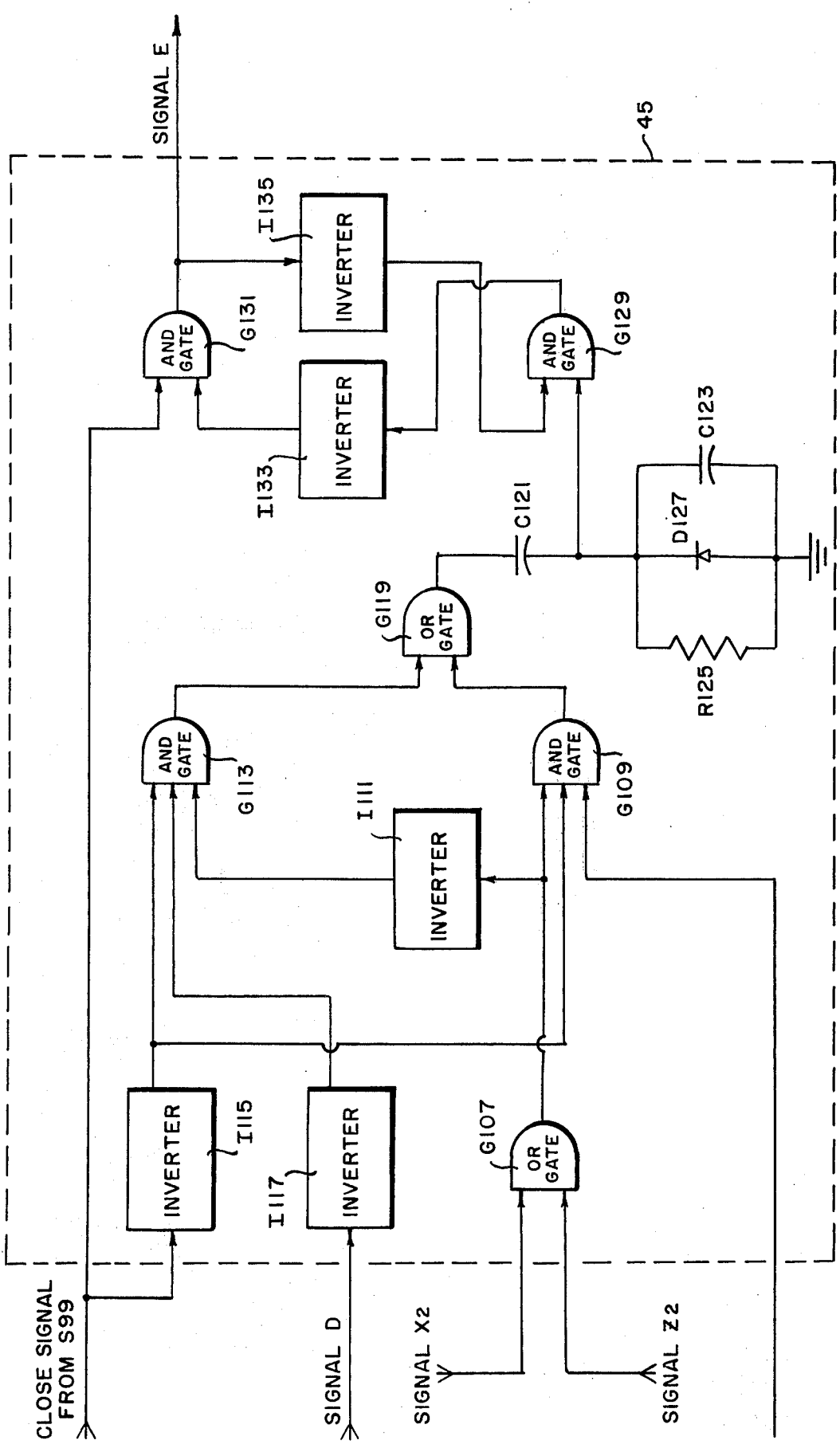
FIG. 6 show the type of logic gate circuit used in the FIG. 2 system.

Briefly, the FIG. 6 logic gate circuit operates by a signal (X2 or Z2) to its OR gate G107. Should the signal level be low when it enters or exits from one of the FIG. 6 components it may be thought of as a binary zero and if positive as a binary one. A positive X2 or Z2 voltage signal enables this gate. Should the trapped charge be negative corresponding to a low signal at the gate input, the gate output will also be low. The output from gate G107 is sent to AND gate G 109 and inverter I 111. From this inverter the output is to AND gate G113 which normally outputs a low signal but is switched positive when all of its inputs are positive. If the line has a positive trapped charge it causes a positive input to gate G109 from a gate G107 and if the bus voltage is positive in polarity it produces a positive output (signal D) and if an inverted close signal through inverter I115 is received, then the output of gate G109 will be switched from low to high. Normally the close signal F voltage from switch S99 is high and closes negative for the close command. When the output from gate G109 is high, it is sensed at the input of OR gate G119. If one of the inputs to AND gate G109 is low, then its output will also be low. The output from gate G107 is inverted by inverter I111 and is sent as one of the inputs to AND gate G113. Should this gate G107 output be high, then, as its name implies, the inverter will make it low. For example, if a negative trapped charge is sensed it will outputted by inverter I111 as a high level signal sent to gate 113. Similarly, signal D from the zero crossing detector is inverted by inverter I117 and then inputted to AND gate 113. When a negative signal D is sent to inverter I117 to be outputted as a positive signal at the same time there is an inverted close signal through inverter I115, then the output of gate G113 would switch from a low to a high voltage level. From gate G113 the signal is sent to normally low output OR gate G119. An output voltage level change from low to high by either AND gate G109 or AND gate G113 would cause the output of OR gate G119 to switch from low to high. Capacitors C121 and C123, resistor R125, diode D127, and AND gate G129 would sense these changes. It is the function of capacitor C121 and resistor R125 to differentiate the output signal from gate G119 to provide sharp positive and negative pulses. Diode D 127 assures that only positive leading edges of these pulses will be sensed at the input to AND gate G129. Capacitor C123 maintains a high level input signal to AND gate G129.

The two AND gates G129 and G131 form a latch circuit to maintain an output signal to the time delay circuit. Normally a high voltage level is applied to gate G 131 from the close signal along with a high level signal due to the inverted (by inverter I 133) low level signal from the output of gate G 129. In this way a high output signal appears at gate G131 which by inverter I135 assures the output of gate G129 is held low. When a close signal is received, one input to AND gate G131 is switched low which causes its output to switch low. This low output signal is inverted by inverter I135 which makes it a high signal when inputted to gate G129. When the output of gate G119 is switched high, then a positive pulse is applied to gate G129 by the differentiator circuit. This causes the output of gate G 129 to switch and latch high. AND gate G131 is low and remains low until gate G129 returns to the low state. Gate 129 remains high until capacitor C121 discharges through resistor R125 causing its input to go to the low state. If the close signal is removed, gate's G131 output is switched high latching gate G129 in the low state. The output of gate G131 is sent to the time delay and amplifier output circuit 47 as signal E which is either a high or low voltage signal in accordance with the foregoing.

Figure 7:
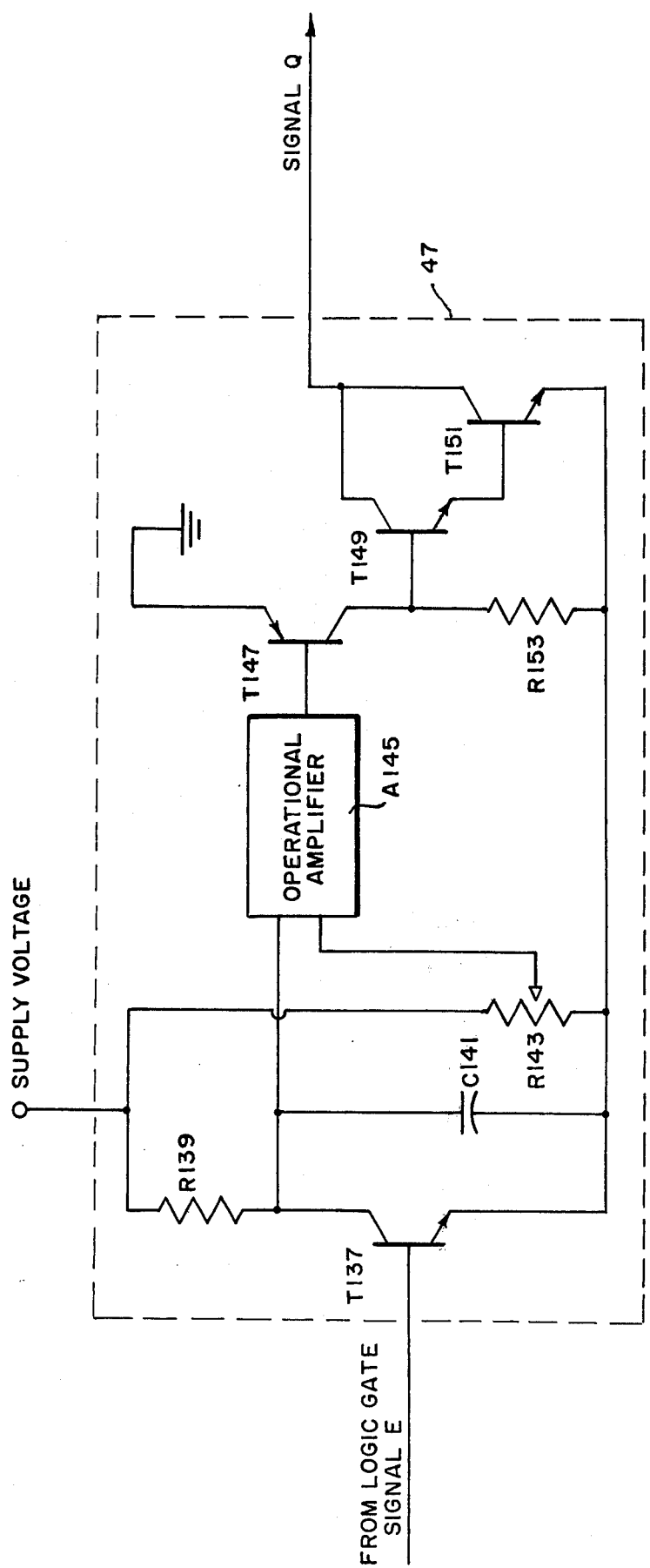
FIG. 7 illustrates a time delay and output amplifier circuit useable with the FIG. 2 system.

FIG. 7 illustrates the circuit components of the delay circuit and output power amplifier circuit. The delay circuit functions to delay the close signal E from the logic gate circuit so that the close coil signal Q will energize the coil 48 at the proper time. This time occurs when switch S23 closes at the proper point on the bus voltage waveform as will be described with respect to FIGS. 8A and 8B. This closure is when switch S15 closes and the current through the closing resistor R17 of FIG. 2 is zero, also shown in FIGS. 8A and 8B. The time delay portion of the circuit 47 is made up of the transistor T137, the resistor R139, the capacitor C141, the potentiometer R143, and the operational amplifier A145. When a high voltage signal E is sent by gate G131 to capacitor C141 this capacitor is normally by-passed by transistor T137. When this AND gate switches to a low state, transistor T137 is turned off and capacitor C141 charges through resistor R139. Amplifier A145 compares the voltage/across capacitor C141 with a reference voltage level set by potentiometer R143. When the capacitor voltage exceeds this preset voltage level, the output of amplifier A145 is switched low which turns "on" transistor T147. The timer period which elapses during which capacitor C141 charges through resistor R139 until the capacitor voltage exceeds the value determined by the setting of potentiometer R143, is a preset time delay. This preset delay, depending on the length of the transmission line, the closing resistor value in ohms, and the closing time of the breaker, permits the closing of switches S23 and S15 shown in FIG. 2 at the proper times shown in FIGS. 8A and 8B.

The remainder of the FIG. 7 circuitry including transistor T147 makes up the power amplifier. It consists of the mentioned transistor, the two transistors T149 and T151, and the resistor R153. When transistor T147 is turned on by the output of amplifier A145 being switched negative, the voltage drop across resistor R153 turns on transistors T149 and T151 which produces a signal Q that energizes the closing coil 48 shown in FIG. 2.

Figure 8B:
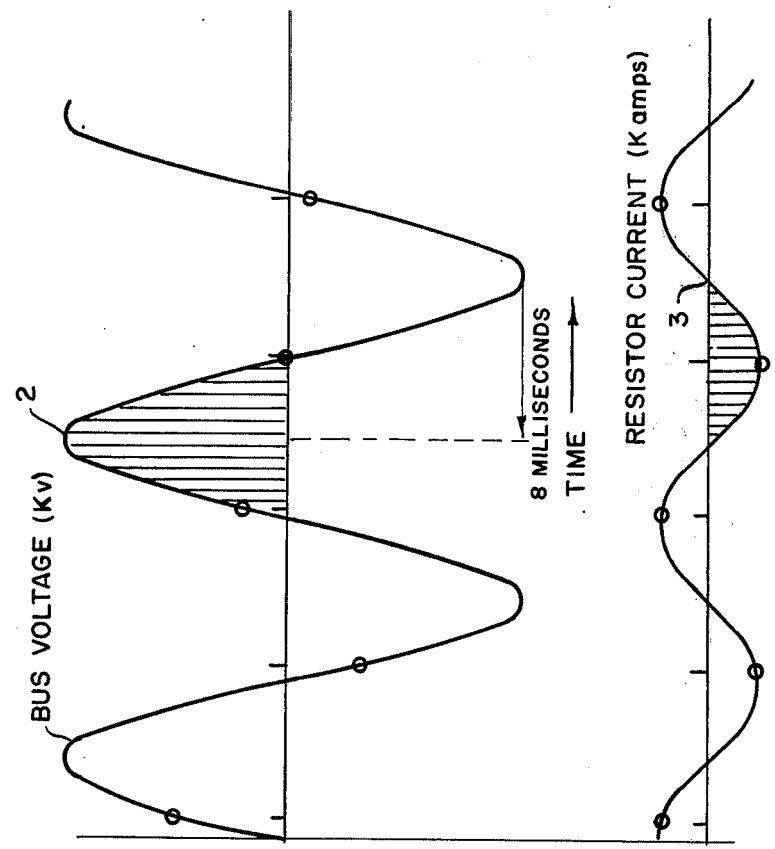
FIG. 8B is a graph of time versus bus voltage and resistor current when the trapped charges are positive.
Figure 8A:
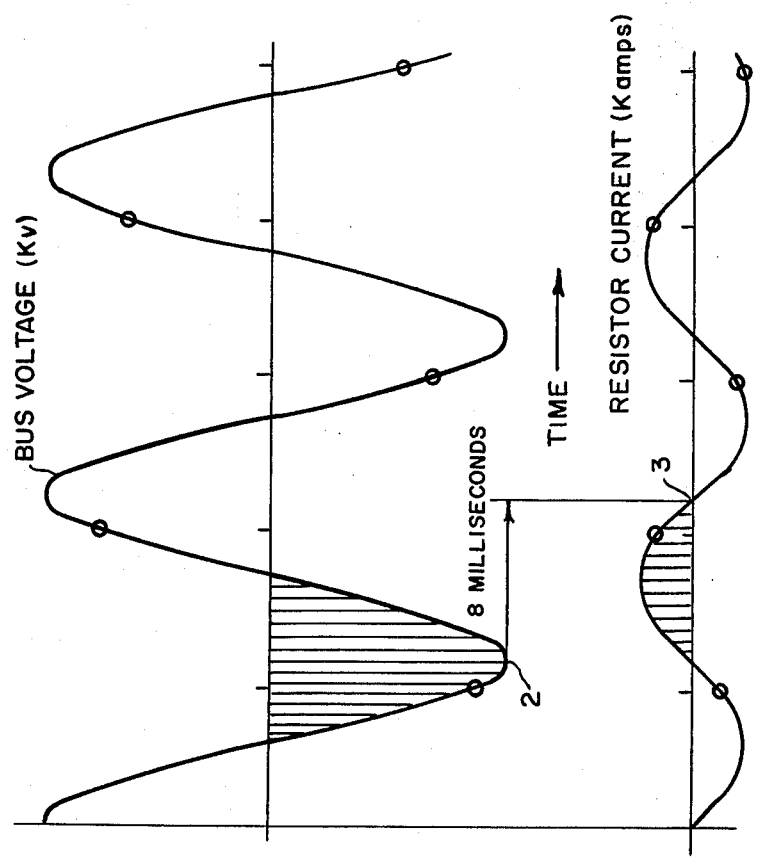
FIG. 8A is a graph of the time versus bus voltage and resistor current when the trapped charges are negative.

FIGS. 8A and 8B are graphs of the bus voltage and current through the preinsertable resistor versus time for a negative and positive trapped charge, respectively. When there are negative voltage trapped charges, as represented by the shaded area of the upper bus voltage graph of FIG. 8A, the resistor insertion switch S23 closes to form a voltage loop. At a point near the crest of the bus voltage wave, (point 2) of this shaded area, the contacts of the reinsertable resistor switch S23 are closed which assures the proper subsequent closing of the main contacts of switch 15. The lower graph of FIG. 8A, representing the current through the preinsertable resistor 17 versus time, has a shaded area corresponding to the polarity of a current loop when the switch contacts of switch 23 close near the crest of the shaded area bus voltage graph (point 2). Since these graphs are based on a wave of 60 cycles per second a.c., one complete cycle (1/60 sec.) will take about 16.67 milliseconds. At point 3 of this same lower graph, zero current is present through the preinsertable resistor when the main switch S15 closes approximately 8 milliseconds after switch S23 closed at point 2.

The graph of FIG. 8B represents a plot of the bus voltage and preinsertable resistor current versus time for a positive trapped charge. The shaded area of the bus voltage plot illustrates when the resistor insertion switch S23 will close. At point 2 of this area the contacts of switch S23 will close for the proper subsequent closing of the contacts of the main switch S15. In the lower resistor current plot, the shaded portion represents the polarity of the current loop in resistor R17 when the switch S23 is closed at point 2. Point 3 of the current plot is the current zero point of the resistor current waveform where the main contacts of switch S15 close approximately 8 milliseconds after the contacts of switch S23 are closed at point 2.

In one working embodiment of the preferred embodiments of circuits described in FIGS. 3–7, the following types of components were utilized: operational amplifiers A69, A81, A91, and A145 were types LM 101; operational amplifiers A60 and A97 were type LM 108; AND gates were type MM 54C08; OR gates types 54C32; Inverters type MM 54C04; and transistors (NPN) T137 and (PNP) T147 types 2N3053 and 2N4037, respectively. All of the foregoing were manufactured by National Semiconductor Corporation of Santa Clara, Cal. In addition, NPN transistor T149 had Darlington type designation MJ 3041 and NPN transistor T151 Darlington type No. SVT 6060. These were manufactured by Motorola Semiconductor Products of Phoenix, and TWR Semiconductors Inc. of Lawndale, Cal., respectively.

Although our invention has been described with respect to a specific embodiment, it should be apparent to those familiar with the art that other embodiments components, or variations can also be used. None of these changes should be used to limit the scope and spirit of our invention which is to be limited only to the claims that follow.

We claim:

1. A programable method for limiting the voltages surges on a high voltage alternating current power line upon closure of a main contact switch which is connected in parallel with a single normally preinsertable resistor comprising the steps of:

first continuously monitoring the polarity of the bus voltage and trapped line charge voltage on both sides of said main switch at the time said switch is opened;

second comparing the monitored polarities against each other and when of equal polarity, operatively inserting said resistor into the power line before closure of said main switch; and then predetermining the time of closure of said main switch when the voltage difference between its bus and line sides will be near zero and then effectively by-passing the inserted preinserted single resistor by closure of the main contact switch.

2. The method of claim 1 wherein there is a fixed predetermined time interval between the insertion of said resistor and the closure of said main switch.

3. The method of claim 1 wherein to determine the polarity of said bus and trapped line charged voltages the actual voltage levels are first divided by a factor of at least several hundred.

4. The method of claim 1 wherein the closure of said main contact switch takes place automatically at a time interval of less than one cycle of the bus voltage after the resistor is inserted into the power line.

5. The method of claim 1 wherein the polarity of the line trapped charge is determined by observing the performance of the alternating voltage waveform one-half cycle before the main contact switch is opened.

6. A power circuit breaker controller for use with a circuit breaker on an alternating current high voltage power line comprising:

a main contact switch for opening and closing the line between its bus voltage side and its line side;

a single preinsertable resistor and switch combination connected in parallel to said main contact switch;

circuit means for comparing the detected polarities and for inserting said single resistor operatively into said line before said main switch is closed when the same polarities are detected;

means for continuously detecting the zero point on wave of the bus voltage signal; and means for comparing the detected zero point on wave against the signal on the line side and for actuating said main switch to close said main contact switch after said single resistor is inserted and when the bus voltage signal and the signal on the line side are near zero.

7. The controller of claim 6 wherein said circuit means for comparing the detected polarities comprises logic gate circuitry connected to the outputs from polarity memory circuits which are operatively associated with both the bus and line side of said main contact switch.

* * * * *